United States Patent
Beaver et al.

(10) Patent No.: US 7,045,164 B2
(45) Date of Patent: May 16, 2006

(54) SOYBEAN PROCESSING

(75) Inventors: Michael J. Beaver, Victoria, MN (US); Scott D. Ites, Alden, IA (US)

(73) Assignee: Cargill, Incorporated, Wayzata, MN (US)

( * ) Notice: Subject to any disclaimer, the term of this patent is extended or adjusted under 35 U.S.C. 154(b) by 422 days.

(21) Appl. No.: 10/007,902

(22) Filed: Nov. 8, 2001

(65) Prior Publication Data
US 2004/0146627 A1    Jul. 29, 2004

Related U.S. Application Data
(60) Provisional application No. 60/247,845, filed on Nov. 9, 2000.

(51) Int. Cl.
  A23L 1/20    (2006.01)
  A23L 1/211   (2006.01)
(52) U.S. Cl. .................. 426/482; 426/479; 426/634
(58) Field of Classification Search ................ 426/634, 426/479, 489, 482
See application file for complete search history.

(56) References Cited

U.S. PATENT DOCUMENTS

| | | | |
|---|---|---|---|
| 4,041,187 A * | 8/1977 | Nelson et al. | 426/598 |
| 4,158,656 A * | 6/1979 | Jones et al. | 530/377 |
| 4,556,573 A | 12/1985 | Bartesch et al. | 426/467 |
| 4,944,954 A * | 7/1990 | Strop et al. | 426/417 |
| 4,985,259 A | 1/1991 | Nii | 426/46 |
| 5,424,457 A | 6/1995 | Sumner, Jr. et al. | 549/408 |
| 5,725,900 A | 3/1998 | De Sadeleer et al. | 426/601 |
| 5,866,192 A * | 2/1999 | Uesugi et al. | 426/634 |
| 5,932,221 A | 8/1999 | Day | 424/195 |
| 5,952,230 A | 9/1999 | Kim et al. | 435/415 |
| 5,972,410 A | 10/1999 | Tsuzaki et al. | 426/598 |
| 6,787,177 B1 * | 9/2004 | Crandall et al. | 426/615 |

FOREIGN PATENT DOCUMENTS

| | | |
|---|---|---|
| EP | 0 839 460 A2 | 5/1998 |
| EP | 1 038 531 A2 | 9/2000 |
| EP | 1 046 396 A2 | 10/2000 |
| EP | 1 142 489 A1 | 10/2001 |
| JP | 53-115836 * | 10/1978 |
| JP | 63-237750 * | 10/1988 |
| JP | 11-196803 * | 7/1999 |
| JP | 11-263786 * | 9/1999 |
| WO | WO 93/23069 | 11/1993 |
| WO | WO/96/10341 | 4/1996 |
| WO | PCT/US01/46580 | 11/2001 |

OTHER PUBLICATIONS

Partial European Search Report.
Serrato, "Extraction of Oil from Soybeans," JAOCS, 157-159, Mar. 1981.
Kudou et al., "Malonyl Isoflavone Glycosides in Soybean Seeds," Agric. Biol. Chem. 55(9), 2227-2233 (1991).
European Search Report dated Jan. 14, 2005.

* cited by examiner

Primary Examiner—Anthony Weier
(74) Attorney, Agent, or Firm—Fish & Ricchardson P.C.

(57) ABSTRACT

Methods are provided for forming soy germ concentrate in a soybean processing operation that produces soy bean oil and soybean meal.

25 Claims, 2 Drawing Sheets

SOYBEAN PROCESSING

CROSS-REFERENCE TO RELATED APPLICATIONS

This application is a continuation-in-part application of and claims priority to U.S. application Ser. No. 60/247,845, filed on Nov. 9, 2000, the full disclosure of which is incorporated herein by reference.

TECHNICAL FIELD

This invention relates to soybean processing, and more particularly to production of soy germ concentrates.

BACKGROUND

The soybean has been utilized for thousands of years as a source of both oil and protein. It is currently one of the most important agricultural sources of these important products, which are used for both animal and human consumption. In addition, with the growing concern over the long term supply of petroleum products, many industrial uses for soybean oil are developing. While other methods exist, soybean oil is typically isolated from the solids by extraction with an organic solvent. The soybean product that remains after extraction of the oil can be either desolventized and toasted, to form a defatted toasted soy meal, for use in an animal feed, or flash desolventized to form an intermediate product, referred to as "white flakes", that is further processed for use in food and nutritional products, e.g., tofu and soy protein isolate.

A raw soybean consists of an outer covering, referred to as the hull; two bean halves, referred to as the meat or cotyledon; and an embryo, referred to as the germ or hypocotyl. In conventional soybean processing, the hulls are often removed, to facilitate oil extraction and to reduce the amount of fiber in the soy meal. In typical soybean processing the oil and the solvent laden white flakes are produced from a mixture of meats (>90% by weight), germ (about 2%), and a small residual percentage of hulls. Further purification of the oil and solvent laden white flakes results in commercially suitable products.

A conventional process for forming soybean oil and solvent laden white flakes from soybeans is shown in FIG. 1. According to this process, soybeans are dried to a moisture content of about 9–11%, tempered for approximately 24–72 hours, and passed through two sets of cracking rolls, to crack the soybean meats into quarters and eighths (i.e., a large portion of the meats are in quarter or eighth size pieces) which causes the hulls to separate from the meats. Most of the hulls are then removed by a series of aspirating and sifting steps. The remaining cracked soybeans are then conditioned (heated to soften them), flaked to facilitate oil extraction, and extracted using a solvent such as hexane. This process results in three products: crude soybean oil, hulls, and solvent laden white flakes. Since solvent laden white flakes are not a commercial product, they need to be further processed by solvent removal and/or toasting desolventizing. In the process shown in FIG. 1, some of the germ is processed with the meats, and some may be unintentionally aspirated off with the hulls.

Recently, the medical and nutrition community have become aware that soy germ contains a relatively higher concentration of nutrients (e.g., isoflavones, tocopherols and sterols) than the meat. Thus, efforts have been made to separate a very pure (>90%) soy germ fraction from a soybean stream, e.g., as described in WO 96/10341 and U.S. Pat. No. 5,952,230. These references, however, do not describe how the separation of soy germ from soybeans would be successfully integrated into a process for producing soybean oil and low fiber solvent laden white flakes.

SUMMARY

The phrase "white flakes", as used herein, refers to a defatted, untoasted soy material. When this term is preceded by the phrase "solvent laden", it refers to a defatted, untoasted soy material that has not been desolventized; otherwise it refers to a defatted, untoasted soy material that has been desolventized.

The phrase "soy germ concentrate" refers to a cracked soybean stream that contains a higher concentration of soy germ per unit mass than is found naturally in unprocessed soybeans.

The phrase "soy meal", as used herein, refers to a defatted, desolventized, toasted, and ground soy material. The phrase "soy germ meal" refers to a soy meal formed from soy germ concentrate.

The inventors have discovered a method of integrating the separation of soy germ, to form a soy germ concentrate, into a soybean processing facility, without disturbing the normal production of soybean oil and defatted low fiber solvent laden white flakes.

Because the germ constitutes such a small fraction of the soybean (less than 2% by weight), an enormous volume of soybeans must be processed to obtain a commercial quantity of high purity soy germ. If the soy germ is then extracted to form soy germ oil, an even greater quantity of soybeans is required, since the pure soy germ contains only about 10% –12% fat by weight. The inventors have recognized that, by integrating germ separation into a production line that produces soybean oil and low fiber solvent laden white flakes, without disturbing the production of these products, relatively high volumes of soy germ concentrate can be produced at an economically viable cost. In addition, the cost of producing soybean oil, solvent laden white flakes, and hulls is not significantly impacted. As a result, four products can now be made in a processing facility that previously made only three, with little increase in operating costs or impact on fiber removal and only a relatively small capital investment in additional machinery.

In preferred implementations, the germ is separated from the soybean stream when the soybeans have been cracked such that about 50% of the cracked particles are larger than 3.35 mm. Typically, at least about 50% of the meats are broken into halves and quarters and the remaining meats are either whole or cracked to eighths or smaller pieces. When the soybeans have this particle size distribution, most of the meats are much larger than the germ, which typically has an average particle size of less than three cubic millimeters. As a result, the germ can be separated from the meats by size, to form a soy germ concentrate containing a relatively high percentage of soy germ. The meats can then be reintroduced into the soybean processing stream and processed to form soybean oil and solvent laden white flakes using most conventional processes.

In one aspect, the invention features a method of producing a soy germ concentrate including separating soy germ from a cracked soybean stream wherein the cracked soybean stream has a size cracked such that about 50% of the cracked particles are larger than 3.35 mm.

Implementations of this aspect of the invention may include one or more of the following features. The method further includes cracking whole soybeans to produce said cracked soybean stream. The method further includes dehulling the separated soy germ. The cracked soybean stream has a moisture content of at least 8% by weight, preferably from about 9 to 11%. The method further includes, after separating, further processing the remaining cracked soybean stream to produce soybean oil and soybean meal.

In another aspect, the invention features an in-line production process for separating a cracked soybean stream wherein the stream contains soybean meats, germ, and hulls. The method includes: (a) separating a portion of the germ from the steam to produce a soy germ concentrate and a remaining stream; and (b) after step (a), processing the remaining stream to form soybean oil and solvent laden white flakes.

Implementations of this aspect of the invention may include one or more of the following features. Steps (a) and (b) are performed as part of a continuous process. Step (b) includes further cracking the remaining stream. Step (b) includes removing a portion of the hulls from the stream. Step (b) includes flaking. The cracked soybean stream has a moisture content of at least 8% by weight, preferably from 9 to 11%. The solvent laden white flakes are further processed into soy meal or white flakes. The further processing includes desolventizing. The further processing further includes toasting. The soybean oil is further processed through refining.

In a further aspect, the invention features a process including: (a) cracking soybeans to form a first soybean product; (b) separating the first soybean product to form a soy germ concentrate and a second soybean product; (c) cracking the second soybean product to form a third soybean product; and (d) processing the third soybean product to form soybean oil and solvent laden white flakes.

Implementations of this aspect of the invention may include one or more of the following features. Step (a) includes cracking the soybeans to a particle size cracked such that about 50% of the cracked particles are larger than 3.35 mm. Steps (a)–(d) are performed as part of a continuous process. Step (d) includes dehulling and flaking. The process further includes (e) desolventizing and toasting to form soy meal. The process further includes (f) cooling and grinding the toasted soy meal. The soybean oil is further processed through refining. The process further includes (e) flash desolventizing the solvent laden white flakes. The cracked soybean stream has a moisture content of at least 8% by weight, preferably about 9 to 11%.

In yet another aspect, the invention features a manufacturing plant for processing soybeans, including a production line including, in series: (a) a first cracking machine configured to produce a first soybean product containing germ, broken meats and hulls; (b) a separation device configured to separate at least a portion of the germ from the first soybean product to form a soy germ concentrate and a second soybean product; (c) a second cracking machine, configured to further crack the second soybean product to form a third soybean product.

The manufacturing plant may further include, after the second cracking machine, (d) a dehulling machine for separating at least a portion of the hulls from the third soybean product. The manufacturing plant may also include, after the dehulling machine, (e) a flaking machine, and (f) a solvent extraction machine.

The invention also features a method of producing a soy germ concentrate including separating soy germ from a cracked soybean stream wherein the stream contains soybean meats, germs and hulls, by separating the germs from the meats based on the respective sizes of the germs and meats.

The processes of the invention produce products having novel properties. For example, due to the removal of a portion of the soy germ from the soybean stream to form soy germ concentrate, the processes may produce a soybean meal containing less than 1.5% soy germ. Due to the relatively low concentration of soy germ, the soybean meal will generally have an isoflavone content that is reduced relative to the isoflavone content of a soybean meal that has been prepared without extracting any germ fraction. Generally, the mass percent isoflavone content will be from about 2 to 30 percent lower than that of a soybean meal that has been prepared without extracting any germ fraction. The isoflavone content of a solvent laden white flake product produced using a method of the invention will be reduced to a similar extent. Similarly, a crude soybean oil produced by a process of the invention will generally have a reduced sterol content relative to the sterol content of a crude soybean oil prepared by a process that does not involve any germ extraction, e.g., about 2 to 30 percent lower. The soy germ concentrate produced by the processes of the invention may have a sterol content of from about 1.6 to 3.0 weight percent, preferably from about 1.8 to 2.5 weight percent, and an isoflavone content of from about 2.4 to 3.0, preferably about 2.6 to 2.9. Processes of the invention may also produce a toasted soy germ meal having an isoflavone profile that is advantageously similar to the isoflavone profile of unprocessed soybeans, e.g., a total isoflavone content of greater than 2.5%.

Other features and advantages of the invention will be apparent from the description and drawings, and from the claims.

DETAILED DESCRIPTION

Figure 1:
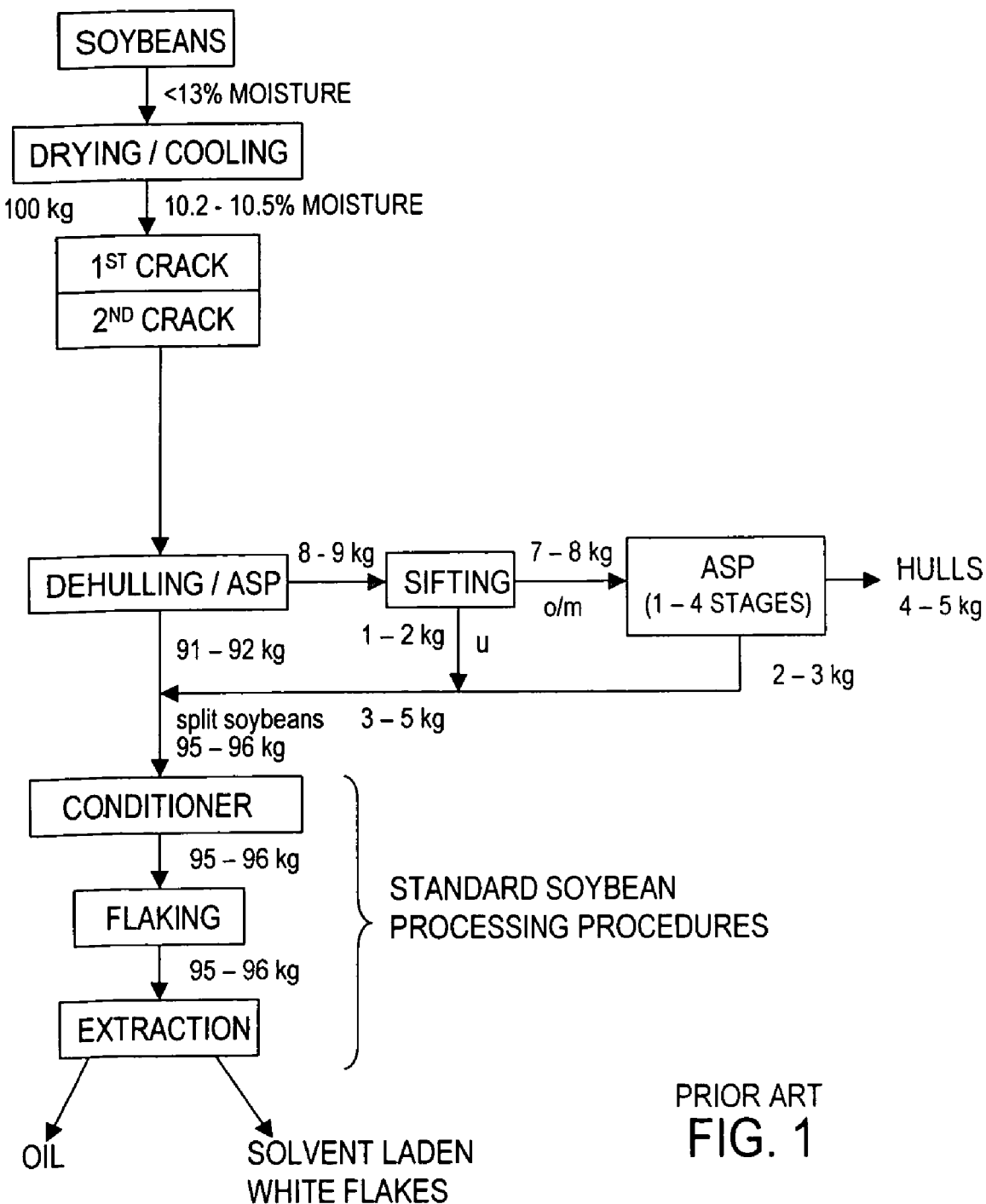
FIG. 1 is a flow diagram illustrating a prior art process.
Figure 2:
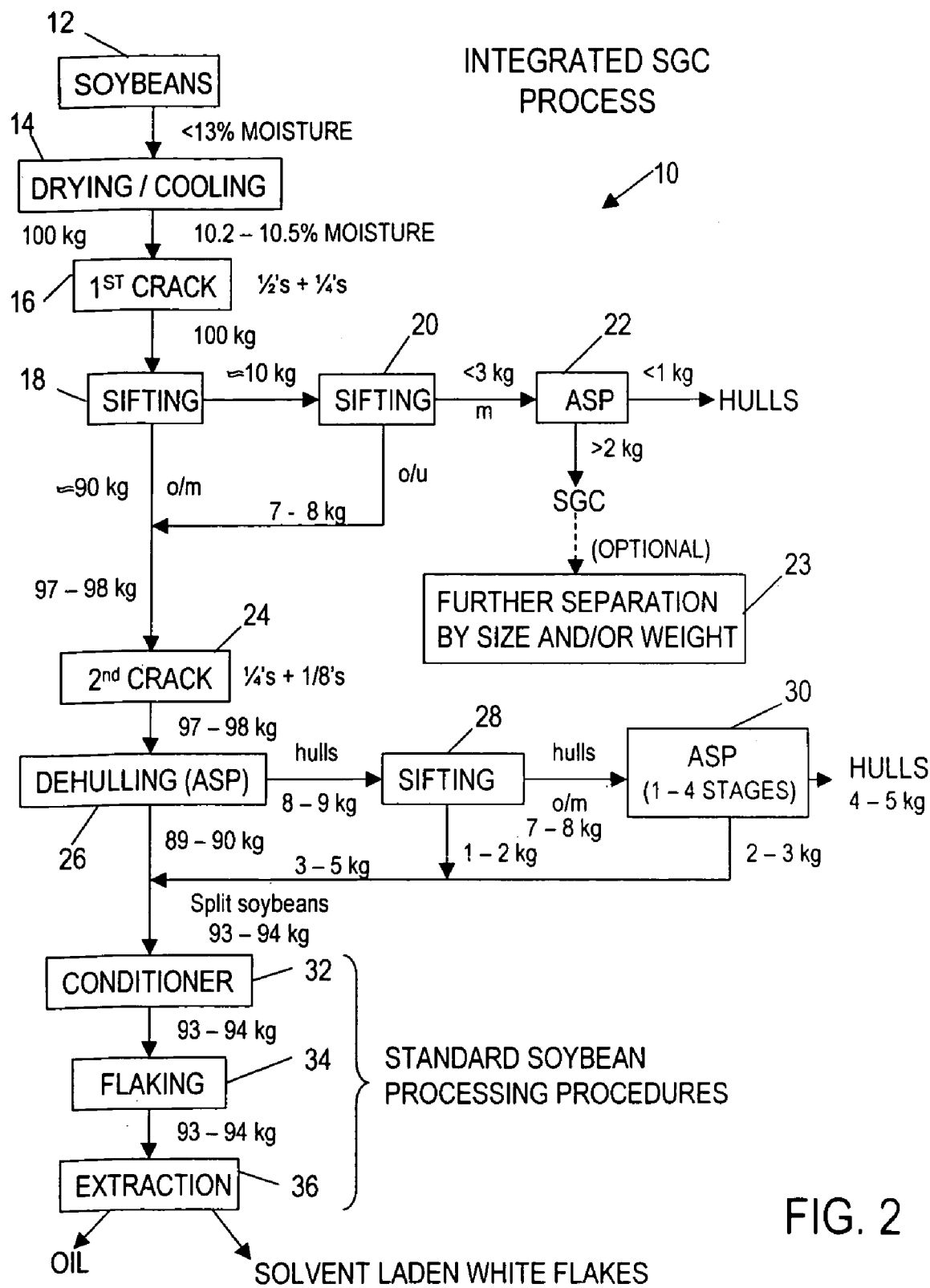
FIG. 2 is a flow diagram illustrating a process according to one aspect of the invention.

FIG. 2 illustrates a preferred integrated process 10 for forming soy germ concentrate, soybean oil, and solvent laden white flakes. Since solvent laden white flakes are not a commercial product in themselves they must be further processed into soy meal or white flakes by processes well known in the art. According to the present process, soybeans are introduced to the processing facility (12), dried to a moisture content of from about 9 to 11% by weight, more preferably about 10.2 to 10.5%, and tempered (14), generally for about 24–72 hours.

Next, the soybean stream is coarsely cracked in a first cracking machine (16), such that about 50% of the cracked particles are larger than 3.35 mm. At this stage, approximately 50% of the meats are in halves and quarters, most of the germ is broken away from the meats, and some of the hulls have broken away from the meats. Many of the hulls may still be adhered to the meats. Typically, there will be some whole soybeans in the cracked stream, and some meats that are broken into smaller fragments, e.g., eighths and smaller. The higher the percentage of meats that are in halves and quarters, the easier it will be to separate the germ from the meats by size, resulting in a soy germ concentrate containing a higher percentage of germ. If the cracked stream contains too high a percentage of half and whole soybeans, however, this may disrupt further processing, and will also reduce the yield of soy germ, since the germ will remain with the whole soybeans. It is generally important that the moisture content of the soybeans be at least about 9%, as at lower moisture contents the soybeans may tend to shatter during this initial cracking step, resulting in an undesirably high percentage of fine pieces, making separation of soy germ extremely difficult.

The particle size distribution of the cracked stream may be changed by adjusting the spacing of the cracking rolls, as is well known in the soybean processing art. In order to make the fine adjustments that may be necessary to obtain a desired yield of soy germ concentrate (or a desired concentration of germ in the concentrate), it may be desirable to provide a device for precise process control and adjustment of the roll spacing. Generally, to maintain a given yield and purity of soy germ concentrate containing a given percentage of germ, the spacing will need to be adjusted to compensate for changes in soybean quality and moisture content.

The cracked stream then passes through an initial sifting machine (18), which separates the larger meat and hull pieces from the stream and sends the larger pieces to a second cracking system (24) and further conventional soybean processing, as will be described below. Sifting machine (18) generally includes one or more screens having a mesh size that is selected so that the fraction that passes through this screen contains inherently small meat pieces, most whole and partial germ particles, and some hull fragments. The fraction that passed through this screen is then sifted again, through a multi-screen sifter (20) which includes at least two screens, having mesh sizes that are selected so that the meat pieces that are larger than the germ will be retained on the uppermost screen, most of the fines (predominantly small pieces of hulls and very small meat pieces) will pass through both screens, and most of the germ will pass through the upper screen but not the lower screen. Thus, the middle fraction will be selected for further processing to form the soy germ concentrate.

In screening any material, the size of particles passing through the screen will be determined by the actual screen opening and not strictly by the mesh count per lineal inch because materials (wires) of varying diameters and configurations may be used to form the screen. The actual screen opening is typically described as a percentage of the overall screen area and/or by specific dimensions. A preferred sifter configuration for the present invention includes the following screen sizes:

| Sifter (18) | | | |
| --- | --- | --- | --- |
| Upper screen | 6 mesh | 0.035 in diameter wire | 63% open |
| Lower screen | 7 mesh | 0.028 in diameter wire | 65% open |
| Sifter (20) | | | |
| Upper screen | 741 ton cap | | 0.075 × 0.375 slot |
| Lower screen | 18 mesh | 0.009 in diameter wire | 70% open |

The mesh size will vary depending on the beans used, their moisture content, and other factors. Other suitable mesh sizes can be readily determined empirically and may vary only slightly from the preferred sizes described above. Suitable sifting machines are well know in the art and can be obtained from a number of various suppliers including Rotex Incorporated. In addition, a perforated plate configuration could be used in a similar fashion.

The larger pieces of meat that do not pass through the upper screen of (20) are sent to the second cracking system (24) for further processing. The bottom fraction from (20) may be aspirated (not shown) to separate the hulls from the meats, with the meats being sent on for further processing (re-entering the process at or below the second cracking machine or at the conditioning step) and the hulls added to the hulls that are separated during other processing steps.

The middle fraction from (20) is then aspirated (22) to remove additional hulls. Aspiration may be performed using a conventional Kice brand aspirator or equivalent aspiration method. If using a Kice brand aspirator, it is important that the aspiration be conducted at a relatively low air pressure, e.g., less than about 1.0 inch of water pressure, typically from about 0.8 inches to 0.4 inches. At air pressures near or above 1.0 inch of water, an undesirable amount of the germ may be removed with the hulls depending on conditions.

The remaining stream, containing soy germ, residual hulls and small meat pieces, may be sold as a soy germ concentrate (SGC). The soy germ concentrate resulting from the process described above will generally contain a significant percentage of meats and hulls, e.g., the concentration of soy germ is generally from about 30–75%. The concentration will vary, depending on the quality and moisture content of the soybeans and the particle size distribution of the cracked stream.

If a higher concentration of soy germ is desired, more of the meat pieces may be separated out by size, by further sifting through screens having a closer range of mesh sizes. If the remaining meat pieces are of approximately the same size as the germ, the germ may be further separated from the meats by gravity based separation technology such as a gravity table. The soy germ is generally denser than the meat pieces, and thus for pieces of a given size the germ will tend to separate from the meats when processed in this manner. Alternatively, the germ can be separated by calorimetric or other technologies known in the art. Using these procedures, a soy germ concentrate having a high concentration of soy germ, e.g., greater than 70% and in some cases greater than 90%, can be obtained. Because the majority of the meats are returned to the oil/white flake production stream immediately after the first cracking, even this higher concentration soy germ concentrate can be obtained without any disturbance to the normal production of soybean oil and solvent laden white flakes.

The soy germ can be sold immediately after separation, or can be further processed in ways similar or identical to those utilized routinely in the art to process soy beans. For example, the soy germ may be ground and/or toasted (to inactivate enzymes) to form various forms of soy germ flour. These soy germ flours have been found to possess a desirable isoflavone profile, in that they are unexpectedly high in total isoflavones, typically containing 2.5% or more total isoflavones. Moreover, the isoflavone profile is very similar to that of the natural soybean, for example the soy meal contains a relatively high proportion of the acylated forms of the isoflavones. The acylated isoflavones are generally absorbed more slowly into the bloodstream than other forms of isoflavones, and thus it is believed that the soy germ flour of the present invention may provide a desirable sustained release of isoflavones when ingested.

While the soy germ concentrate production process described above is being performed, soybean oil and solvent laden white flakes are being produced simultaneously. As noted above, the meats that are separated from the germ are immediately transferred to a second cracking machine (24). At this point, the meats are further cracked so that at least about 50% of the meats are in quarters and eighths. This step breaks most of the hulls from the meats, and is important in order to assure the quality of the solvent laden white flakes (excess fiber, provided by the hulls, is undesirable in the end products produced from the white flakes) and to obtain an acceptable yield of soybean oil (excess hulls influence retention time and tend to interfere with extraction).

The resulting stream then goes through standard soybean processing procedures, to process the stream into soybean oil and solvent laden white flakes. Thus, the stream is dehulled by aspiration and sifting (26)–(30) to separate most of the hulls from the meats, and the dehulled stream is conditioned (32), flaked (34) and extracted (36) using standard procedures well known in the art. A portion of the flaked material may be expanded (not shown) in order to improve extraction efficiency, as is well known.

The solvent laden white flakes can be processed further, e.g., by flash desolventization, to form white flakes, or by desolventization, toasting, cooling and grinding, to form soybean meal. The crude soybean oil can also be processed further, e.g., by further purification and deodorization, as is well known.

Advantageously, all of the steps after the second cracking can be performed just as they would be performed in a conventional soybean processing facility that does not include a germ separation step.

Preferably, the process described above is performed on a commercial scale and on a continuous basis, i.e., the process is generally performed in a plant capable of processing at least 5,000 bushels of soybeans per day and is performed 24 hours a day, 7 days a week, with the exception of periodic shut-downs.

As noted above, one advantage of the invention is that four products can be produced, in commercial volumes, using a production line that previously produced only three products. The only major changes that are generally necessary are: (a) adding the sifting and aspiration machines (18)–(22) and equipment to transfer the beans to and from these machines, and (b) providing separate cracking machines for the first and second cracking steps. Thus, a relatively small capital investment is needed in order to convert an existing production facility to production of soy germ concentrate. Generally, once the new processing steps are in place, the increase in operating cost will be relatively small.

The quality of the products obtained will also be substantially unchanged. Since the soy germ is very high in isoflavone and sterol content, the most significant change will be a reduction in the isoflavone and sterol content of the soybean oil and solvent laden white flakes that is commensurate with the isoflavones and sterols that are present in the removed germ. Thus, the soybean oil and solvent laden white flakes (and the white flakes or soy meal produced therefrom) will have a reduced concentration of isoflavones, sterols and tocopherols. This reduction provides the first opportunity for meal users, oil refiners, and white flake processors to access products of these types. This is important primarily because the nutritional and health benefits of these products are not completely understood. For example, soy derived products are widely utilized in the preparation of infant formula and foods where the estrogenic effects of isoflavones may be undesirable. Therefore, the present invention provides a valuable alternative to individuals and businesses that utilized soy products. In addition, because dehulling can generally be performed as effectively using the process of the invention as using conventional processes, soy meals produced from the process of the invention will generally have conventional fiber and protein levels, e.g., less than 3.8% fiber and protein levels of about 47% to about 49%.

If desired, the soy germ concentrate may be processed, using conventional extraction procedures, to form soy germ oil. Because large volumes of soy germ concentrate can be obtained using the process described above, commercial quantities of soy germ oil can also generally be produced at a commercially viable cost. Alternatively, the soy germ concentrate can be toasted and ground, as discussed above, to form soy flour, or can be solvent extracted and used as a starting material for isoflavone production.

The first and second cracking machines (16), (24), may be either conventional cracking machines having two sets of rolls, with one set of rolls set in an open position or both rolls spaced sufficiently widely to obtain the desired size distributions, or a cracking machine having a single set of rolls.

EXAMPLE 1

During a representative day of production one embodiment of the present invention was performed in the following manner:

1) A soy germ concentrate was formed using the process shown in FIG. 2 and described above.

2) The moisture content of the soybeans after tempering was 9.8%.

3) The screen sizes used were those described above.

4) The aspiration pressure used to remove hulls from the soy germ concentrate was 0.8 inches water pressure.

5) The particle size distribution after the first cracking step (20) was as described below. Samples were taken approximately every 30 minutes for four hours.

The following US Screens were used and the data reported as wt % retained on the screen. The following methods were utilized. (AACC 55-30 and AOCS Da 28 (97))

| Screen size | Sample | | | | | | | | |
|---|---|---|---|---|---|---|---|---|---|
| | #1 | #2 | #3 | #4 | #5 | #6 | #7 | #8 | #9 |
| #4 | 20.5 | 18.8 | 18.2 | 21.8 | 20.6 | 19.2 | 20.4 | 18.1 | 20.5 |
| #5 | 30.0 | 33.3 | 36.1 | 33.6 | 34.4 | 34.1 | 33.4 | 32.8 | 36.1 |
| #6 | 16.1 | 16.0 | 15.1 | 15.7 | 16.1 | 15.6 | 16.6 | 16.4 | 15.9 |
| #7 | 13.3 | 13.1 | 12.3 | 11.9 | 12.2 | 12.8 | 12.2 | 12.9 | 11.3 |
| #8 | 9.5 | 9.0 | 8.5 | 7.6 | 7.6 | 7.7 | 7.7 | 8.2 | 6.7 |
| #10 | 3.6 | 3.4 | 3.2 | 2.9 | 3.0 | 2.9 | 3.0 | 3.4 | 2.9 |
| #12 | 1.7 | 1.6 | 1.5 | 1.3 | 1.3 | 1.4 | 1.4 | 1.7 | 1.4 |
| pan | 5.3 | 5.1 | 5.1 | 5.2 | 4.8 | 6.3 | 56 | 6.5 | 5.2 |

4 4.75 mm;
5 4.00 mm;
6 3.35 mm;
7 2.80 mm;
8 2.38 mm;
10 2.00 mm;
12 1.70 mm.

The particle size distribution after the second cracking step (24), using the identical screens and methods was as follows.

| Screen size | #1 | #2 | #3 | #4 | Sample #5 | #6 | #7 | #8 | #9 |
|---|---|---|---|---|---|---|---|---|---|
| #4 | 0.4 | 0.2 | 0.2 | 0.2 | 0.3 | 0.2 | 0.2 | 0.2 | 0.2 |
| #5 | 5.0 | 3.5 | 2.7 | 2.6 | 3.1 | 3.1 | 3.2 | 2.9 | 3.1 |
| #6 | 19.2 | 13.2 | 11.6 | 11.8 | 11.5 | 11.7 | 13.5 | 13.2 | 12.5 |
| #7 | 30.1 | 33.8 | 30.9 | 32.7 | 31.0 | 29.5 | 30.7 | 30.6 | 30.2 |
| #8 | 26.9 | 29.2 | 32.4 | 32.6 | 31.8 | 31.1 | 29.7 | 30.5 | 29.9 |
| #10 | 9.8 | 10.0 | 11.6 | 11.0 | 11.5 | 12.1 | 11.1 | 11.2 | 11.4 |
| #12 | 2.9 | 3.2 | 3.6 | 3.2 | 3.5 | 3.8 | 3.7 | 3.6 | 3.7 |
| pan | 5.7 | 6.9 | 7.0 | 5.9 | 7.3 | 8.5 | 7.9 | 7.8 | 9.0 |

The results of the soy germ separation process were as follows:

1) Overall plant processing rate was 93,101 bushels per day;

2) Yield of soy germ concentrate was 2.54% or 2,364 bushels;

3) Purity of soy germ concentrate was 61.45%

4) Total sterol levels in soy germ concentrate samples taken throughout the day ranged from 2.44% –2.55%.

EXAMPLE 2

During a representative two day production period, soybean oil and soybean meal samples were taken under two conditions: (a) on day one, the soy germ separation equipment was turned off, so that soy germ was not separated from the feed stream, and (b) on day two, the soy germ separation equipment was turned on, separating soy germ from the feed stream according to the procedures described above in Example 1. Four samples each of crude soybean oil and soybean meal were taken under each condition. The samples were taken at approximately 20 minute intervals. The oil samples were tested for total sterol content (% sterol) (see AOCS Ca 60-40, AOCS Ce 3-74, and AOCS Ch 6-91.) The meal samples were tested for total isoflavone content (% isoflavone) (see, Murphy, Patricia A. et al, Isoflavones in Retail and Industrial Soy Foods, J. Agric. Food Chem., vol. 47, pp. 2697–2704). The isoflavone content is expressed as a range because the results of various samples were not averaged. The results of this testing are shown in the tables below:

Crude Soybean Oil

| Sample # | Separation On/Off | Sterol (%) |
|---|---|---|
| 1 | Off | 0.461 |
| 2 | Off | 0.407 |
| 3 | Off | 0.441 |
| 4 | Off | 0.381 |
| 5 | On | 0.360 |
| 6 | On | 0.377 |
| 7 | On | 0.399 |
| 8 | On | 0.363 |

Soybean Meal

| Sample # | Separation On/Off | Isoflavone (%) |
|---|---|---|
| 1 | Off | 0.353–0.343 |
| 2 | Off | 0.357–0.361 |
| 3 | Off | 0.348–0.357 |
| 4 | Off | 0.387–0.378 |
| 5 | On | 0.300–0.299 |
| 6 | On | 0.306–0.306 |
| 7 | On | 0.303–0.303 |
| 8 | On | 0.314–0.301 |

The sterol content of samples 5–8 of the soybean oil was lower than the sterol content of samples 1–4. Similarly, the isoflavone content of samples 5–8 of the soybean meal was lower than the isoflavone content of samples 1–4. Using conventional statistical methods, it was determined that these differences were statistically significant.

Thus, the samples taken when soy germ was being removed from the feed stream exhibit lower sterol and isoflavone contents than the samples taken when soy germ was not being removed. As discussed above, soy germ has a relatively higher sterol and isoflavone concentration than the rest of the soy bean, and thus these differences appear to confirm that soy germ is being effectively removed from the feed stream by the separation process.

Reduction of Sterol and Isoflavone Levels

Crude soybean oil typically has a sterol level ranging from 0.32% –0.35%. Substantially pure soy germ has a sterol level of approximately 4.5% as tested in the soy germ oil. Sterol levels will fluctuate from crop year to crop year and even within a crop year based upon the levels naturally occurring in the beans. The same is true for isoflavone levels present in the meal produced. Typically isoflavone levels in meal processed in the traditional manner are approx. 0.35%. Isoflavone levels of substantially pure germ are approximately 2.5%. The present invention is directed towards lowering the levels of these compounds present in the oil and meal that are produced from the soybean stream (not from the separated soy germ concentrate). Depending upon yield and purity of soy germ concentrate, sterol levels in crude oil and isoflavone levels in meal or white flakes can be reduced from 2–30 percent. Preferably the reduction will be consistently in the range of 5–20 percent. The data above mathematically indicates a reduction of approximately 15%. Therefore, the present invention is directed towards providing a statistically significant reduction of the sterol and isoflavone levels in the products of a soy bean processing facility.

Further Processing of Soy Germ Concentrate

The soy germ concentrate prepared according to the present invention can be further processed by toasting and grinding to yield a soy flour. Toasting and grinding conditions are well known in the art and the extent to which the material is processed will depend on the particular needs of various customers. Milder toasting will produce a product having an isoflavone profile most similar to the naturally occurring profile. Preferably the soy germ concentrate will only be toasted to the extent necessary to inactivate enzymes present in the material. (For example, 200 degrees centigrade for approximately 10–15 minutes. This will preserve the isoflavone profile and provide the mildest flavor possible.

Analysis Method for Concentration of Soy Germ in Samples.

Analysis of the concentration of soy germ in various samples is performed by hand sorting small samples of soy germ concentrate and subsequently determining the percent germ by mass of the sample. Typically, an approximately one gram sample of soy germ concentrate is sorted by an operator into two fractions. The first is whole or partial soy germ particles the second is all other materials. The second fraction may contain soybean meats, hull, weed seeds, and other materials. The first fraction is weighed, and the purity of soy germ is then expressed as the mass of the germ divided by the total mass of the sample separated. In the case of continuous production, samples of the soy germ concentrate are taken throughout the day, commingled, and a representative sample removed to be analyzed.

The sterol and isoflavone contents of the soy germ concentrate, soy meal, soy bean oil, and other products can be determined using a wide variety of analytical techniques well known in the art. Typically the soy germ concentrate, or other material, is extracted with a specific solvent and the extract is analyzed by HPLC or GC to determine levels of sterols or isoflavones by comparing with known standards.

Other embodiments are within the scope of the following claims. For example, while continuous processes have been discussed above, the processes of the invention may be used in batch processing if desired. In addition, the present process may be utilized with traditional or genetically modified soybeans.

We claim:

1. A method of producing a soy germ concentrate comprising: (a) cracking whole soybeans to produce a cracked soybean stream having a cracked size such that about 50% of the cracked particles are larger than 3.35 mm; (b) prior to any further cracking, separating soy germ from the cracked soybean stream; and (c) after separating, further processing the cracked soybean stream that remains after the soy germ has been removed to produce a soybean product.

2. The method of claim 1 further comprising dehulling the separated soy germ.

3. The method of claim 1 wherein the cracked soybean stream has a moisture content of at least 8% by weight.

4. The method of claim 3 wherein the moisture content is from about 9 to 11%.

5. The method of claim 1 wherein the further processing comprises producing soybean oil and soybean meal.

6. An in-line production process comprising:
    (a) cracking whole soybeans to produce a cracked soybean stream having a cracked size such that about 50% of the cracked particles are larger than 3.35 mm, the cracked soybean stream containing soybean meats, germ, and hulls, the process comprising:
    (b) separating a portion of the germ from the stream to produce a soy germ concentrate and a remaining stream; and
    (c) after step (b), processing the remaining stream to form soybean oil and solvent laden white flakes.

7. The production process of claim 6 wherein steps (b) and (c) are performed as part of a continuous process.

8. The production process of claim 6 wherein step (c) comprises further cracking the remaining stream.

9. The production process of claim 6 or 8 wherein step (c) comprises removing a portion of the hulls from the stream.

10. The production process of claim 6 wherein step (c) comprises flaking.

11. The production process of claim 6 wherein the cracked soybean stream has a moisture content of at least 8% by weight.

12. The production process of claim 6 wherein the solvent laden white flakes are further processed into soy meal or white flakes.

13. The production process of claim 12 wherein the further processing comprises desolventizing.

14. The production process of claim 13 wherein the further processing further comprises toasting.

15. The production process of claim 6 wherein the soybean oil is further processed through refining.

16. The production process of claim 11 wherein the moisture content is from about 9 to 11%.

17. A process comprising:
    (a) cracking soybeans to a cracked size such that about 50% of the cracked particles are larger than 3.35 mm, to form a first soybean product;
    (b) separating the first soybean product to form a soy germ concentrate and a second soybean product;
    (c) cracking the second soybean product to form a third soybean product; and
    (d) processing the third soybean product to form soybean oil and solvent laden white flakes.

18. The process of claim 17 wherein steps (a)–(d) are performed as part of a continuous process.

19. The process of claim 17 wherein step (d) includes dehulling and flaking.

20. The process of claim 19 further comprising (e) desolventizing and toasting the solvent laden white flakes to form soy meal.

21. The process of claim 20 further comprising (f) cooling and grinding the toasted soy meal.

22. The process of claim 17 wherein the soybean oil is further processed through refining.

23. The process of claim 17 further comprising (e) flash desolventizing the solvent laden white flakes.

24. The process of claim 17 wherein the cracked soybean stream has a moisture content of at least 8% by weight.

25. The process of claim 24 wherein the moisture content is from about 9 to 11%.

* * * * *